(No Model.)
F. W. MORGAN.
ELASTIC TIRE AND MEANS FOR ATTACHING SAME.
No. 604,067. Patented May 17, 1898.
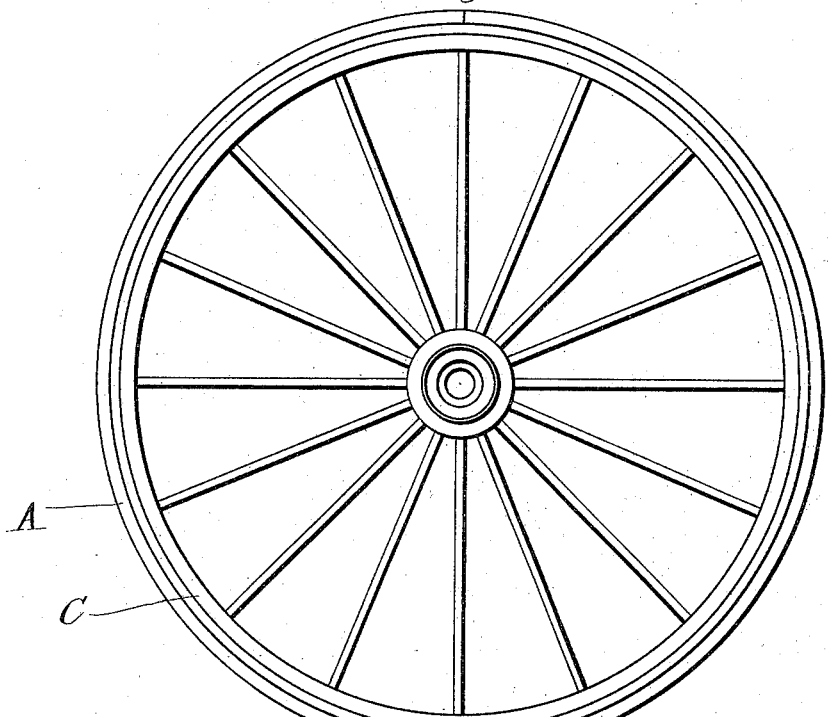
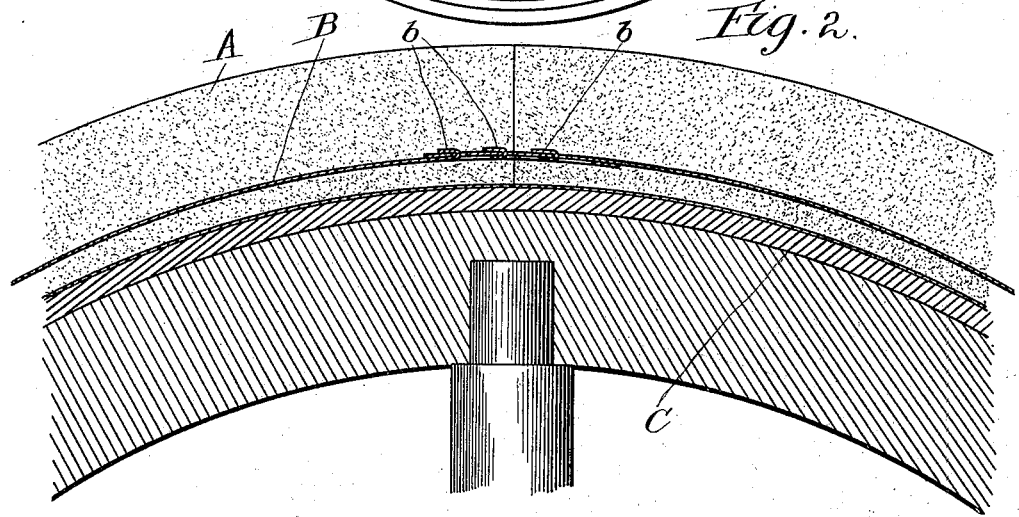
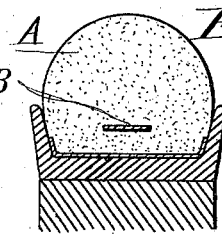
Witnesses: A. F. H. Durand, M. M. Wagner.
Inventor: Fred W. Morgan. by Chas. G. Page, Atty.

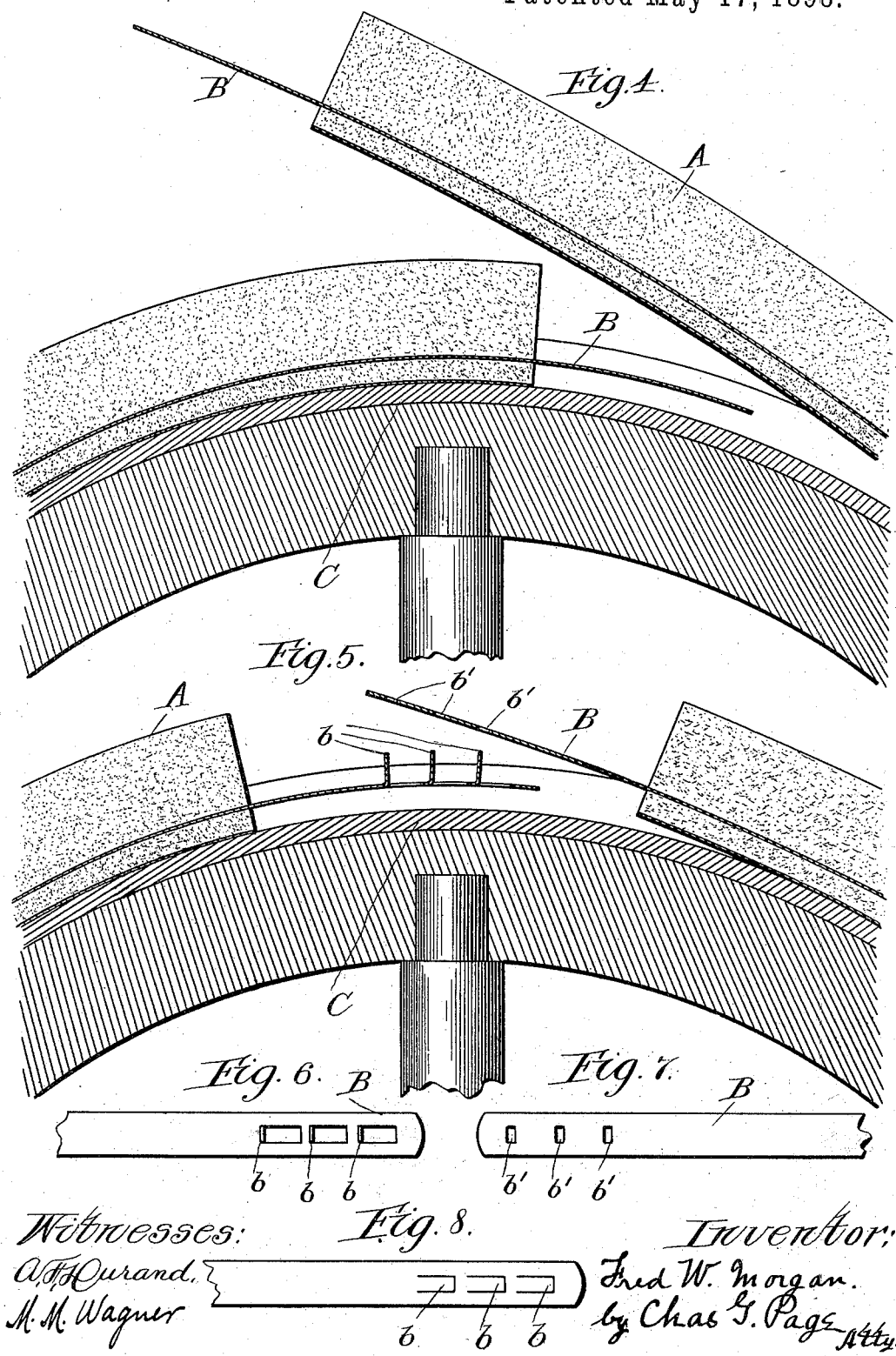

UNITED STATES PATENT OFFICE.

FRED W. MORGAN, OF CHICAGO, ILLINOIS, ASSIGNOR TO THE MORGAN & WRIGHT, OF SAME PLACE.

ELASTIC TIRE AND MEANS FOR ATTACHING SAME.

SPECIFICATION forming part of Letters Patent No. 604,067, dated May 17, 1898.

Application filed March 16, 1898. Serial No. 674,127. (No model.)

*To all whom it may concern:*

Be it known that I, FRED W. MORGAN, a citizen of the United States, residing at Chicago, in the county of Cook and State of Illinois, have invented a certain new and useful Improvement in Elastic Tires and Means for Attaching the Same to Vehicle-Wheels, of which the following is a specification.

My invention relates to elastic tires composed of a solid or substantially solid rubber or rubber-composition body of a length to extend along the channeled rim of a vehicle-wheel and meet at its ends and provided with means for securing it in place within the channel.

Prior to my invention various forms and arrangements of bands or wires for thus securing the tire have been proposed, but so far as I am informed the method generally adopted in this country has been to provide the tire with a couple of wires and to weld together the ends of each wire after the tire has been placed within the channel. The object of my invention is to avoid such process of welding, to provide simplified means for securing the tire in place, to facilitate the operation of securing the tire upon the wheel-rim, to avoid cutting through the base portion of the tire, as is commonly incident to the use of wires, and to permit the tires to be readily and effectively secured by unskilled labor.

To the attainment of the foregoing and other useful ends, my invention consists in matters hereinafter set forth.

In the accompanying drawings, Figure 1 shows in side elevation a vehicle-wheel provided with a tire understood to be secured in place in accordance with my invention. Fig. 2 is a section through a portion of the wheel and tire on a larger scale. Fig. 3 is a section taken transversely through the tire and a portion of the wheel-rim. Fig. 4 is a view corresponding with Fig. 2, but showing the tire unattached and illustrating a step in the operation of securing it upon the wheel-rim. Fig. 5 is a like view illustrating a further step in the operation of securing the tire upon the wheel-rim. Figs. 6 and 7 illustrate end portions of the attaching-band with the tongues or catches on one end portion forced out laterally. Fig. 8 shows an end portion of the band with the tongues or catches in the plane of the band.

The tire A is of the class commonly known as a "solid-rubber" wheel-tire, being made of rubber or rubber composition, and is preferably somewhat greater in length than the circumference of the wheel-rim. This tire is provided with a thin flexible securing-band B, which extends longitudinally within the tire from the end thereof, also having its end portions extending somewhat beyond the ends of the tire, as in Fig. 4. The length of tire is also preferably greater than the circumference of the wheel-rim, as illustrated in said figure, so that in order to bring the ends of the tire together when the tire is upon the wheel-rim, so as to form a joint, the end portions of the tire must be forced back upon the band, thereby compressing the rubber and rendering it less liable to become cut or injured during use, it being understood that such compression will be distributed equally, or substantially so, throughout the entire length of the tire. When the tire applied as in Fig. 4 is forced back upon the band, as in Fig. 5, the exposed end portions of the band can be reduced to proper lengths for lapping by cutting off as much as may be necessary of their terminal portions, after which the ends of the bands can be lapped the one on the other and secured together. After the lapping ends of the band have been thus secured together the end portions of the tire, under compression, as aforesaid, can be readily brought together, still, however, leaving the tire under longitudinal compression, since in Fig. 5 it is understood to have an excess of longitudinal compression for the purpose of permitting the ends of the band to be secured together.

In Fig. 4 the tire is of such length that it must be longitudinally compressed to permit its ends to meet upon the wheel-rim, and hence the length of the band is somewhat greater than its ultimate length, so as to permit its ends to be exposed and available to be taken hold of during the operation of longitudinally compressing the tire. When, however, the tire is longitudinally compressed to an extent to not only permit its ends to meet, but also to an extent to leave a temporary gap between them, as in Fig. 5, the band will of course be found too long, and hence portions of it can be cut off.

In order to fasten together the end portions of the band when the ends of the tire have been forced back upon the band, as in Fig. 5, one end portion of the band is provided with a series of tongues $b$, and the opposite end portion of the band is provided with a series of openings $b'$, through which the tongues can be inserted. After thus inserting the tongues through such openings the tongues, which should be pliable, so as to allow them to be bent, can be bent down upon the band $a$, and as they can be clamped therein so as to lie flatwise the ends of the tire can be readily slipped along such end portions of the band, so as to bring them together, as in Fig. 1.

The tongues and openings in the band can be cut preparatory to placing the tire upon a wheel-rim, the band being cut, as illustrated in Fig. 8, so as to leave the tongues in the plane of the band, and after applying the tire to a wheel-rim and forcing back the ends of the tire and suitably shortening the band, as in Fig. 5, the tongues can be deflected laterally to the band, as in said Fig. 5, by any suitable tool. I can, however, punch both the holes and the tongues after the ends of the tire have been suitably forced back and the band has been suitably shortened by cutting away suitable lengths of its terminal portions. In such case the tire can be molded with the band extending longitudinally through it, since in such case the tire can with suitable tools or appliances be readily slipped back upon the band. The tire can, however, be molded with a flat core and the latter can be withdrawn and the band provided with tongues or openings, can then be inserted through the tire or the band without such tongues, and holes can be thus introduced, and the tongues and holes can be punched or cut after such insertion. The band is also preferably a thin strip of pliable metal or metallic composition, whereby both the holes and tongues can be readily cut out and the tongues readily bent by a suitable tool.

The tire can be variously formed; but preferably its upper portion is part cylindric or substantially so. The lower side portions of the tire incline inwardly and its base side is preferably flat. The band is desirably located at a point between the lower inclined side portions of the tire and not far above the flat base side thereof. The width of the band prevents it from cutting through the base of the tire, as is frequently the case where fastening-wires are employed. The wheel-rim to which the tire is applied preferably comprises an annular channel-iron C, having inclined and downwardly-converging inner side walls, substantially as illustrated. The tire is seated within the groove or channel of such channel-iron and is held therein by the thin-metal or metal-composition band.

The feature of a thin pliable metal or metallic-composition band constitutes a matter of special improvement, since the tires can be molded in straight lengths, and when applied to a wheel-rim the band will readily bend and conform to the circle of the wheel-rim, and the tongues made therein can be suitably bent without breaking.

The band when made thin and flexible can be also readily bent and punched and, if desired, its ends could be punched and riveted together and the rivets headed down flat on the band, so as to allow the ends of the tire to slip together. While, therefore, I desire to claim the fastening devices illustrated as matters of special improvement, I desire to also cover the feature of the tire provided with a thin flexible-metal or metallic-composition band suitably punched and secured at its lapping ends by fastening devices clamped down flat upon the band, so as not to interfere with the free sliding movement of the tire in a direction to bring its ends together.

I am aware that it has been proposed to provide elastic vehicle-wheel tires with fastening-bands; but I am not aware that the invention and improvements herein involved have been either proposed in the patented art or employed in practice prior to my invention.

What I claim as my invention is—

1. The combination with a vehicle-wheel having a channeled rim portion, of an elastic rubber or rubber-composition tire seated in the channeled rim and provided with an internally-arranged and longitudinally-extending thin flexible metal band having lapping ends, the band being secured at its lapping ends by one or more fastening devices which are inserted through one or more openings punched through the band and clamped down flat upon the band so as to permit end portions of the tire forced back upon the band to slide upon the joined ends of the band and close the one against the other, substantially as set forth.

2. An elastic rubber or rubber-composition tire molded upon a thin flexible band, and secured upon a channeled wheel-rim by fastening devices inserted through suitable openings punched in the band and flattened down upon the band so as to permit the end portions of the tire to slide over the end portions of the band thus secured together, substantially as described.

3. An elastic rubber or rubber-composition tire provided with an internally-arranged and longitudinally-extending thin metal or metallic-composition fastening-band and held seated in a channeled wheel-rim by the latter, the end portions of the fastening-band being lapped and provided with one or more openings and one or more pliable tongues, the latter being inserted through the former and clamped down upon the band, substantially as described.

4. An elastic rubber or rubber-composition tire molded upon a thin, pliable metal or metallic fastening-band and secured upon a wheel-rim by the latter, the end portions of the band being lapped together and provided with one or more openings and one or more pliable tongues, the latter being inserted through the former and clamped down upon the band, substantially as described.

FRED W. MORGAN.

Witnesses:
ARTHUR F. DURAND,
MARGARET M. WAGNER.